US011692655B2

(12) United States Patent
Kury

(10) Patent No.: US 11,692,655 B2
(45) Date of Patent: Jul. 4, 2023

(54) CONNECTION COUPLING

(71) Applicant: Neoperl GmbH, Mullheim (DE)

(72) Inventor: Werner Kury, Mullheim (DE)

(73) Assignee: Neoperl GmbH, Mullheim (DE)

( * ) Notice: Subject to any disclaimer, the term of this patent is extended or adjusted under 35 U.S.C. 154(b) by 0 days.

(21) Appl. No.: 17/055,222

(22) PCT Filed: Sep. 6, 2019

(86) PCT No.: PCT/EP2019/073849
§ 371 (c)(1),
(2) Date: Nov. 13, 2020

(87) PCT Pub. No.: WO2020/049160
PCT Pub. Date: Mar. 12, 2020

(65) Prior Publication Data
US 2021/0215285 A1 Jul. 15, 2021

(30) Foreign Application Priority Data
Sep. 6, 2018 (DE) .......................... 202018105108.3

(51) Int. Cl.
*F16L 33/20* (2006.01)
(52) U.S. Cl.
CPC ................... *F16L 33/20* (2013.01)
(58) Field of Classification Search
CPC ...... F16L 33/20; F16L 33/207; F16L 33/2071
USPC ....................................................... 285/256
See application file for complete search history.

(56) References Cited

U.S. PATENT DOCUMENTS

| 589,216 | A | | 8/1897 | McKee | |
|---|---|---|---|---|---|
| 2,139,745 | A | | 12/1938 | Goodall | |
| 2,147,355 | A | | 2/1939 | Scholtes | |
| 4,330,142 | A | | 5/1982 | Paini | |
| 4,369,992 | A | * | 1/1983 | Fournier | F16L 33/2076 285/256 |
| 4,603,888 | A | * | 8/1986 | Goodall | F16L 33/2076 285/148.13 |
| 5,076,615 | A | * | 12/1991 | Sampson | F16L 33/00 285/253 |
| 5,165,733 | A | * | 11/1992 | Sampson | F16L 33/00 285/253 |
| 5,487,571 | A | * | 1/1996 | Robertson | F16L 33/30 285/239 |
| 5,853,202 | A | * | 12/1998 | Li | F16L 33/30 285/256 |
| 6,899,355 | B2 | * | 5/2005 | Klein | F16L 33/227 285/148.16 |
| 7,849,884 | B2 | * | 12/2010 | Dickel | F16L 33/2073 138/109 |
| 8,752,867 | B2 | | 6/2014 | Mager et al. | |

(Continued)

FOREIGN PATENT DOCUMENTS

| DE | 702913 | 1/1941 |
|---|---|---|
| DE | 3144875 | 9/1982 |

(Continued)

*Primary Examiner* — David Bochna
(74) *Attorney, Agent, or Firm* — Volpe Koenig, P.C.

(57) ABSTRACT

In a connecting coupling (1), it is provided that on at least one rib (8) of a rib structure (7) of a hose nipple (6), at least two rib portions (9, 10) are oriented at an angle relative to one another such that the course directions (17, 18) in the rib portions (9, 10) are oriented at an angle relative to one another.

17 Claims, 11 Drawing Sheets

(56) References Cited

U.S. PATENT DOCUMENTS

| | | | |
|---|---|---|---|
| 9,261,213 B2 * | 2/2016 | Mager | F16L 33/2076 |
| 9,447,904 B2 * | 9/2016 | Kury | F16L 33/207 |
| 9,458,958 B2 * | 10/2016 | Kury | F16L 33/207 |
| 9,969,535 B2 | 5/2018 | Lagler | |
| 2017/0241579 A1 | 8/2017 | Berkholz et al. | |

FOREIGN PATENT DOCUMENTS

| | | |
|---|---|---|
| DE | 60317377 | 5/2009 |
| DE | 102009011411 | 9/2010 |
| FR | 1372180 | 9/1964 |
| WO | 0044639 | 8/2000 |

\* cited by examiner

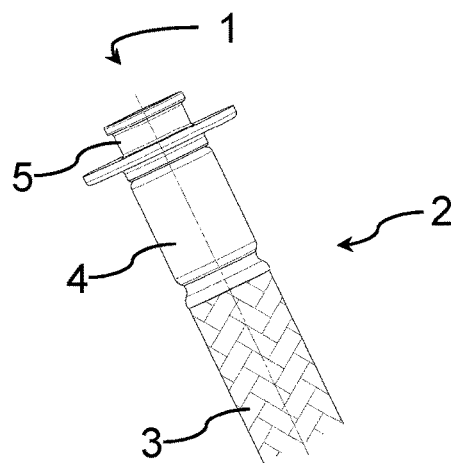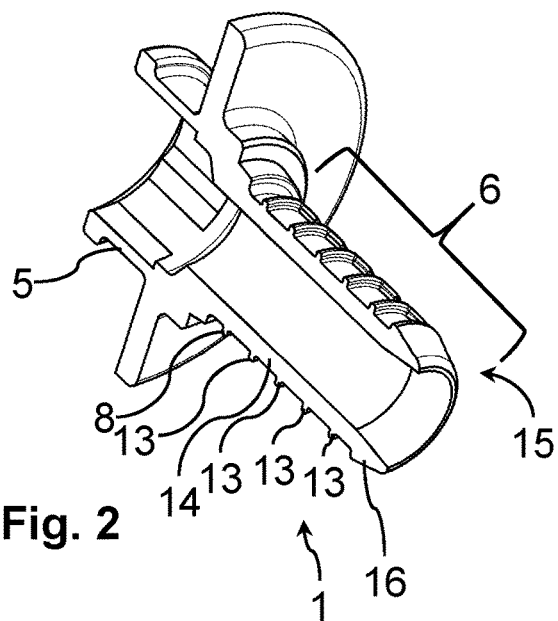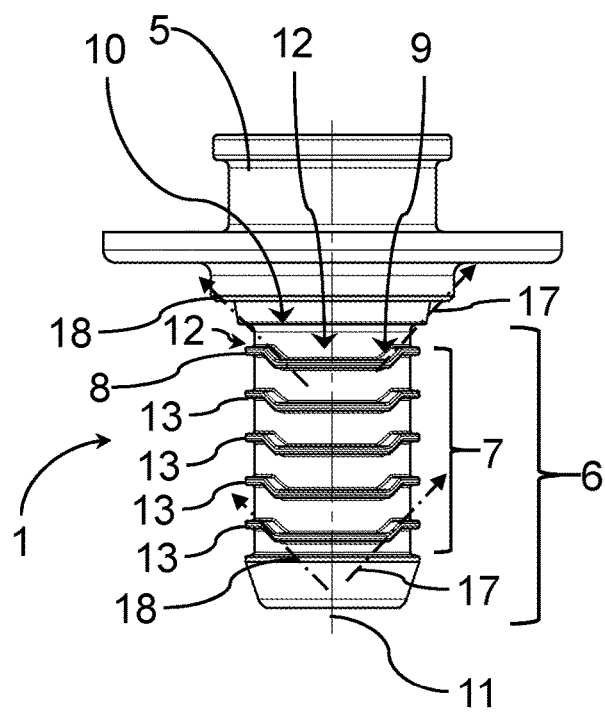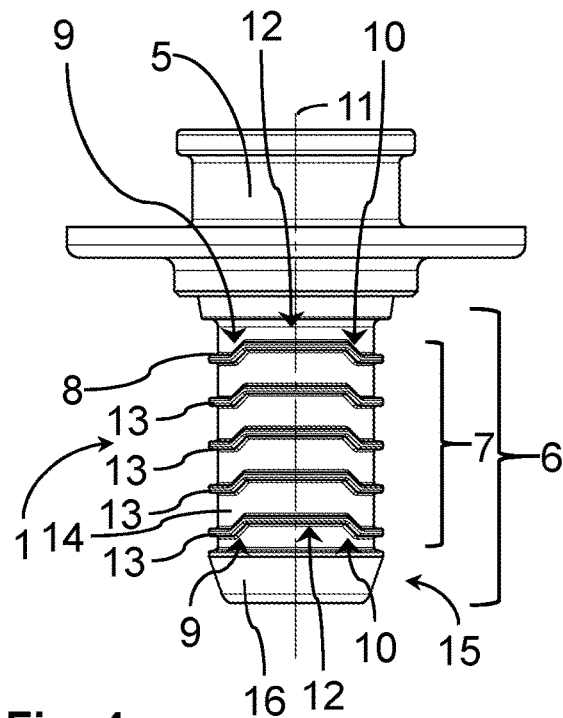
Fig. 1
Fig. 2
Fig. 3
Fig. 4

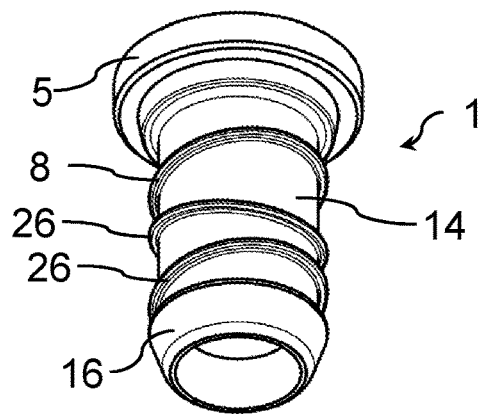
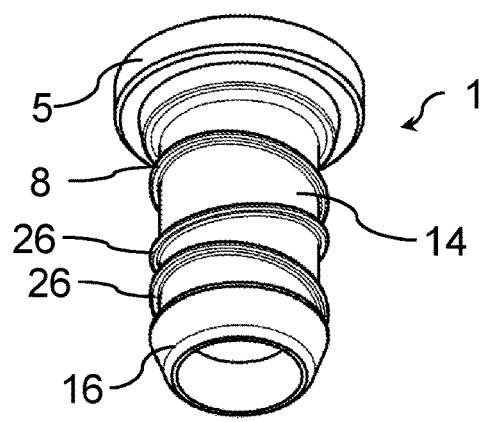
Fig. 37      Fig. 38
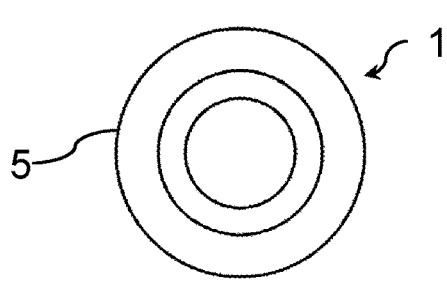
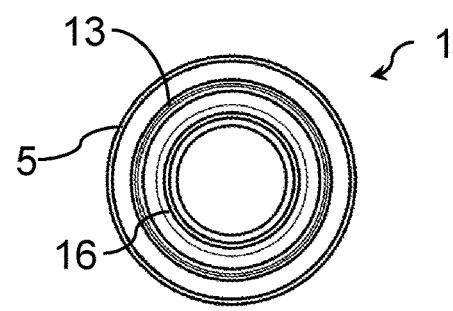
Fig. 39      Fig. 40
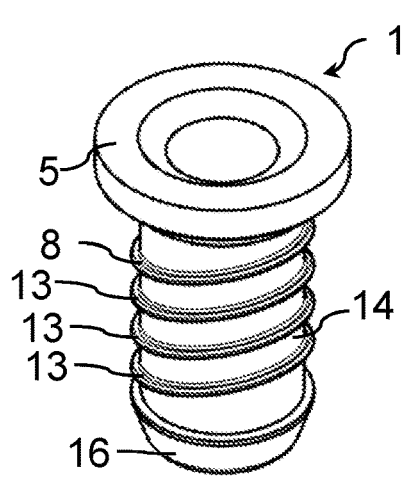
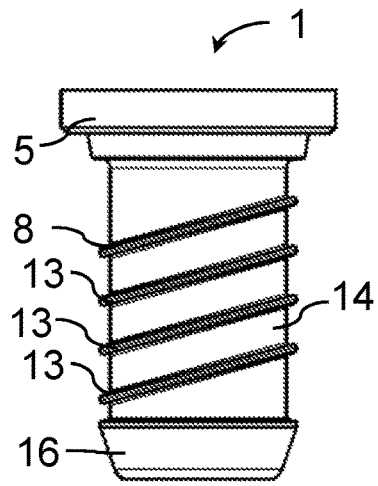
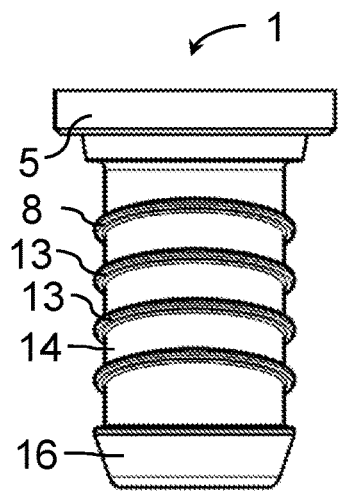
Fig. 41    Fig. 42    Fig. 43

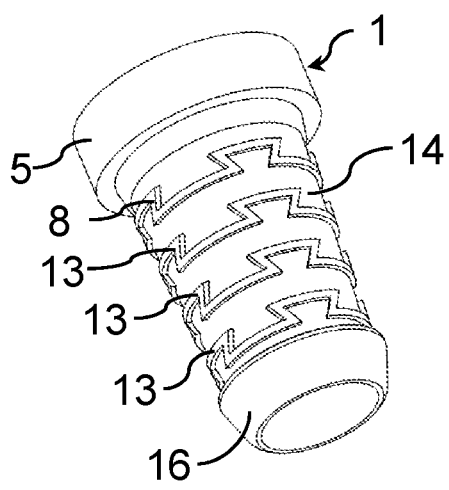
Fig. 44
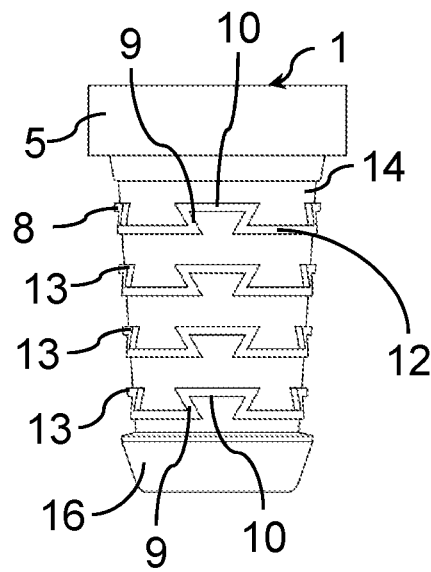
Fig. 45
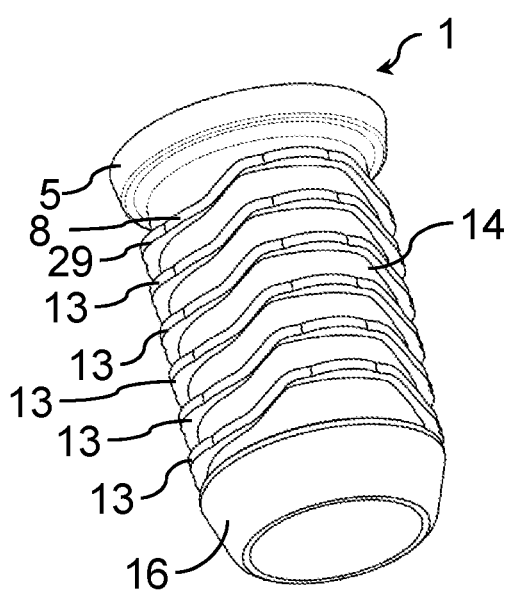
Fig. 46
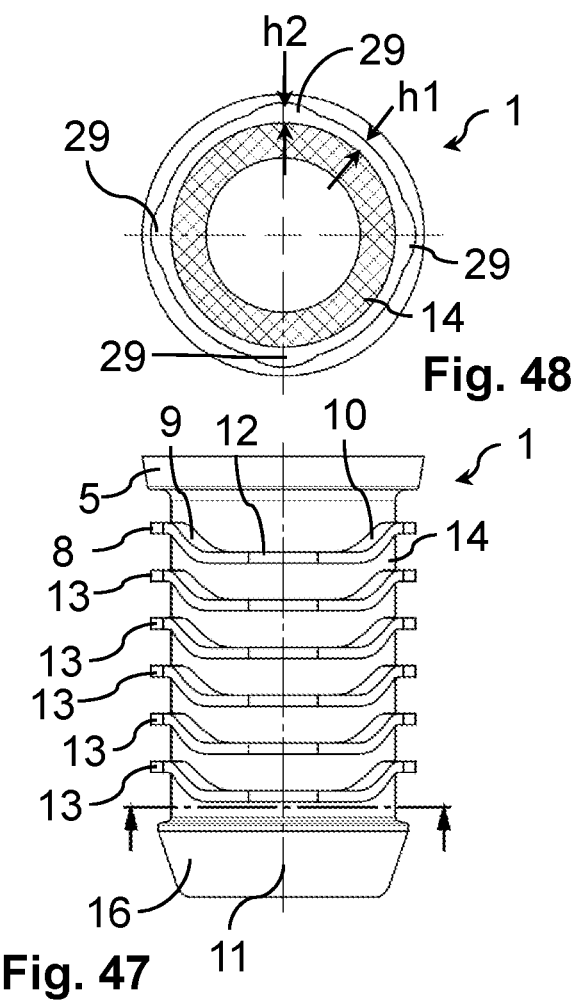
Fig. 48
Fig. 47

CONNECTION COUPLING

TECHNICAL FIELD

The invention concerns a connecting coupling for a hose with a hose nipple on which a rib structure with at least one rib is formed.

BACKGROUND

It is known to form ribs on hose nipples in order to transmit tensile forces. To improve security against twisting, it is proposed to form grooves between two ribs, the groove base of which deviates from a rotational symmetry. It has also been proposed to form ribs with a non-round circumferential contour, i.e. with a circumferential contour which cannot be described by a cylinder wall. The production of such profiles is however often complex.

SUMMARY

The invention is based on the object of creating a rib structure which provides improved security against twisting.

To achieve this object, one or more features of the invention are provided. In particular, thus according to the invention, in a connecting coupling of the type described initially, it is proposed that the rib has at least one direction change in its course. This achieves in a simple fashion that the rib has at least one rib portion running transversely to the circumferential direction of the hose nipple and thus can ensure security against twisting. Preferably, in its course the rib has at least one direction change from the circumferential direction of the hose nipple.

This direction change may for example be characterized in that in its course, the rib undergoes a direction change into an axial direction at least once.

Alternatively or additionally, in a connecting coupling of the type described initially, it is proposed that the rib has a first rib portion and a second rib portion, wherein the first rib portion follows a first course direction and the second rib portion follows at a second course direction, and the first course direction is oriented at an angle to the second course direction. In this way, it can easily be achieved that at least one of the two rib portions is not oriented parallel to the circumferential direction, and hence security against twisting can be achieved in a simple fashion. The angle here may be for example between 30° and 120°, preferably between 45° and 105°. The differing course directions of the first rib portion and the second rib portion ensure in simple fashion that in its course, the rib has a direction change, namely for example from the first course direction to the second course direction. This angle may be defined for example on a rib which extends theoretically in a plane from a base body, i.e. when determining the angle, the influence of the curved surface of the base body may be disregarded.

In one embodiment of the invention, the at least one rib may have a direction change which corresponds to an angle of more than 90°, and for example may lie between 120° and 150°, in particular between 130° and 140°.

In general, the course direction may be followed for example infinitesimally, i.e. for example followed apart from deviations of a higher order, or precisely.

The invention advantageously achieves that the transmissible tensile forces are at least maintained.

The rib portions may here be curved, wherein in this case the course direction is defined as an infinitesimal tangent on the rib portion. The rib portions may also be rectilinear or lie in one plane, wherein in this case the course direction is defined as parallel to the rib portion. In other words, the infinitesimal following of the course direction by the rib in the respective rib portion may be characterized in that deviations of the rib from the course direction may grow more than linearly, for example quadratically, or more than quadratically or exponentially, from the distance of the foot point of the tangent to the rib.

Alternatively or additionally, in a connecting coupling of the type described initially, it is proposed that the at least one rib is formed as a non-crossing circumferential rib, and in at least one rib portion runs obliquely relative to a circumferential direction of the hose nipple. Such an oblique position may be a means for forming a desired security against twisting. A non-crossing rib has the advantage of avoiding narrowing points created at the intersections. Thus any leaks, caused for example because an applied hose cannot fill the narrowing point, can be reduced or even avoided. A continuous rib has the advantage of holding a hose on all sides and avoiding axial seepages which could flow into channels or foot regions of the ribs.

According to an advantageous embodiment, the at least one rib may in at least one portion run obliquely relative to a circumferential direction of the hose nipple. In this way, the rib may absorb torque and thus form security against twisting.

It may furthermore be provided for example that the at least one rib is formed as an ellipse lying obliquely relative to the circumferential direction of the hose nipple. Here, in particular, the at least one ellipse may run around a base body of the hose nipple which may preferably be formed so as to be cylindrical. In particular, if several such ribs are provided which may preferably be arranged tilted against each other, a particularly effective security against twisting is achieved.

In one embodiment of the invention, it may be provided that the at least one rib is formed on a base body, wherein the base body has a cylindrical form.

In one embodiment of the invention, it may be provided that the at least one rib is formed on a base body, wherein the base body has a non-cylindrical form. For example, the form may be non-round in a radial section, for example be angular or polygonal or oval. For example, the form may have a varying circumference and for example, in particular in an axial section, be tapering, bulbous, bulging, convex or concave. One example of a bulbous form is a double cone, wherein the cone base faces are laid on each other.

In one embodiment of the invention, it may be provided that at least one further rib has a further rib portion which is oriented at an angle to the rib portion of the at least one rib. It is advantageous here that additional security can be created against undesirable twisting of a hose on the connecting coupling.

Here for example, it may also be provided that the at least one rib is formed circumferentially and/or is non-crossing, for example with the advantages already described.

In one embodiment of the invention, it may be provided that the rib is formed running around the hose nipple. It is advantageous here that tension relief can be achieved along the entire circumference. In particular, it may be provided that the rib is formed running in a closed loop around the hose. Thus an uninterrupted rib may be formed.

In one embodiment of the invention, it may be provided that the rib is limited to one circumferential portion.

In one embodiment of the invention, it may be provided that the first rib portion adjoins the second rib portion. Thus a gap-free transition can be formed. Alternatively, it may be provided that a transition is formed between the first rib portion and the second rib portion, for example if the rib portions are formed curved.

The first rib portion may thus for example be connected to the second rib portion by the rib. It may also be provided that the first rib portion and the second rib portion are spaced apart from each other.

In one embodiment of the invention, it may be provided that the rib has at least one holding portion running in a radial plane. A radial plane may here be characterized in that it stands perpendicular to a longitudinal axis of the hose nipple. It is advantageous here that such a holding portion may achieve a particularly effective absorption of tensile forces. In particular, it may be provided that the at least one holding portion is delimited at a first end by the first rib portion and/or at a second end by the second rib portion. The security against twisting may thus be provided on both sides adjoining the holding portion. The holding portion may thus be formed adjacent to the first rib portion or the second rib portion. It may be provided that the holding portion is formed between the first rib portion and the second rib portion.

In one embodiment of the invention, it may be provided that the rib structure has a further rib. Thus, a tension relief achieved by the rib may be reinforced. Here, the further rib may for example run at a constant distance from the rib. Thus, the material of an applied hose can be evenly loaded. It may also be provided that the further rib runs offset by a rotational angle relative to the rib. Thus, leaks which may result from an aligned arrangement of the rib portions in the longitudinal direction of the hose nipple can be avoided. For example, the further rib may also be formed continuously, in particular as a closed loop. In particular, it may be provided that the further rib has a first rib portion and a second rib portion, wherein the first rib portion follows a first course direction and the second rib portion follows a second course direction, and the first course direction is oriented at an angle to the second course direction. Here it is advantageous that the security get against twisting may be reinforced by the second rib.

In one embodiment of the invention, it may be provided that the hose nipple has a connecting aid, the maximum outer diameter of which is at least equal to a maximum outer diameter of the rib structure. Thus, a hose can easily be applied over the rib structure. The connecting aid may here be arranged at a free end of the hose nipple, i.e. for example in a region which first comes into contact with a hose when the hose is applied.

In one embodiment of the invention, it may be provided that the hose nipple has a tool separating line which defines a mold removal direction, wherein at every point of its course, the rib is oriented relative to the mold removal direction such that no undercuts occur. For example, a tool separating line lying in a plane may distinguish a mold removal direction which stands perpendicular to this plane. It is advantageous here that the hose nipple can be produced in an injection molding process, wherein the number of tools required can be kept as low as possible. In other words, in this way it may easily be ensured that the molded rib structure does not hinder removal from the mold. This may be achieved for example in that, in the rib portions which form undercuts relative to the mold removal direction because of their profile, the profile is deformed in the mold removal direction so that the undercut disappears.

In one embodiment of the invention, it may be provided that the first rib portion is oriented at an angle to a longitudinal axis, for example the above-mentioned longitudinal axis, of the hose nipple. This may avoid a longitudinal notching of an applied hose. The same may also apply to the second rib portion.

Alternatively or additionally, it may be provided that the first rib portion is oriented at an angle to a circumferential direction, for example the above-mentioned circumferential direction, of the hose nipple. Thus, a simple deviation from a rotational symmetry may be formed which may create security against twisting. The same may also apply to the second rib portion.

It is particularly favorable if the first rib portion and/or the second rib portion is/are oriented both at an angle to the longitudinal axis of the hose nipple and also at an angle to the circumferential direction of the hose nipple. This gives a configuration of the rib or further rib which may easily be produced in the injection molding process.

In one embodiment of the invention, it may be provided that the at least one rib and/or the further rib has/have a varying thickness and/or height. Such deviations from a constant profile of the rib(s) may provide an additional or alternative security against twisting.

In one embodiment of the invention, it may be provided that the at least one rib and/or the further rib has/have a rib profile which is rounded or angular in its foot region and/or its head region. Thus, rib profiles may be provided which:
are rounded in the head region and in the foot region,
are rounded in the head region and angular in the foot region,
are angular in the head region and rounded in the foot region, or
are angular in the head region and in the foot region.

Here for example, angular profile portions in the head region are favorable because these form longitudinal edges on the rib which may dig into the hose material to be retained.

Here for example, rounded profile portions in the foot region are favorable because in this way a higher material strength may be achieved, in particular a component strength, and hence a longer service life.

In one embodiment of the invention, it may be provided that the at least one rib and the further rib have mutually differing rib profiles. Thus, the rib structure may be adapted individually. A rounded head region has the advantage that the hose is protected.

BRIEF DESCRIPTION OF THE DRAWINGS

The invention is now described in more detail with reference to exemplary embodiments, but is not restricted to these exemplary embodiments. Further exemplary embodiments result from combining the features of individual or multiple claims with each other and/or with individual or multiple features of the exemplary embodiments.

The drawings show:

FIG. 1 a connecting coupling according to the invention with an applied and crimped hose end, FIG. 2 the connecting coupling from FIG. 1 in an axial section, FIG. 3 the connecting coupling from FIG. 2 in a side view, FIG. 4 the connecting coupling from FIG. 2 in a side view which is rotated by 90° about the longitudinal axis of the hose nipple relative to FIG. 3, FIG. 5 a further connecting coupling according to the invention in a side view, FIG. 6 a second connecting coupling according to the invention in a side view, FIG. 7 a third connecting coupling according to the invention in a side view, FIG. 8 a fourth connecting coupling according to the invention in a side view, FIG. 9 a fifth connecting coupling according to the invention in a side view, FIG. 10 a sixth connecting coupling according to the invention in a side view, FIG. 11 a seventh connecting coupling according to the invention in a side view, FIG. 12 an eighth connecting coupling according to the invention, FIG. 13 a ninth connecting coupling according to the invention in a side view, FIG. 14 a tenth connecting coupling according to the invention in a side view, FIG. 15 an eleventh connecting coupling according to the invention in a side view, FIG. 16 a twelfth connecting coupling according to the invention in an oblique top view, FIG. 17 the connecting coupling from FIG. 16 in a view rotated by 90° about the longitudinal axis of the hose nipple, FIG. 18 the connecting coupling from FIG. 16 in a side view, FIG. 19 the connecting coupling from FIG. 16 in a side view rotated by 90° about the longitudinal axis of the hose nipple relative to FIG. 18, FIG. 20 the connecting coupling from FIG. 16 in an oblique bottom view, FIG. 21 the connecting coupling from FIG. 16 in a view rotated by 90° about the longitudinal axis of the hose nipple relative to FIG. 20, FIG. 22 an extract from FIG. 9 with the rib, FIG. 23 a further connecting coupling according to the invention in a side view, FIG. 24 an extract from FIG. 23 is similar to FIG. 9, FIG. 25 the extended rib from FIG. 24, FIG. 26 a three-dimensional oblique view of the connecting coupling from FIG. 23, FIG. 27 a further connecting coupling according to the invention in a three-dimensional oblique view similar to FIG. 25, FIG. 28 a rounded rib profile of a rib of a connecting coupling according to the invention, FIG. 29 an angular rib profile of a rib of a connecting coupling according to the invention, FIG. 30 a rib profile of a rib of a connecting coupling according to the invention with an angular head region and rounded foot region, FIG. 31 a further connecting coupling according to the invention in an oblique top view, FIG. 32 the connecting coupling from FIG. 31 in a view rotated by 90° about the longitudinal axis of the hose nipple, FIG. 33 the connecting coupling from FIG. 31 in a side view, FIG. 34 the connecting coupling from FIG. 31 in a side view rotated by 90° about the longitudinal axis of the hose nipple relative to FIG. 33, FIG. 35 the connecting coupling from FIG. 31 in a side view rotated by 90° about the longitudinal axis of the hose nipple relative to FIG. 34, FIG. 36 the connecting coupling from FIG. 31 in a side view rotated by 90° about the longitudinal axis of the hose nipple relative to FIG. 35, FIG. 37 the connecting coupling from FIG. 31 in an oblique bottom view, FIG. 38 the connecting coupling from FIG. 37 in an oblique bottom view rotated by 90° about the longitudinal axis of the hose nipple, FIG. 39 the connecting coupling from FIG. 31 in a top view, FIG. 40 the connecting coupling from FIG. 31 in a bottom view, FIG. 41 a further connecting coupling according to the invention with continuous ribs oriented in parallel, in a three-dimensional oblique view, FIG. 42 the connecting coupling from FIG. 41 in a side view, FIG. 43 the connecting coupling from FIG. 41 in a side view rotated by 90° about the longitudinal axis relative to FIG. 42, FIG. 44 a further connecting coupling according to the invention with a conical base body, FIG. 45 a side view of the connecting coupling from FIG. 44, FIG. 46 a further connecting coupling according to the invention with non-crossing circumferential ribs which are oriented obliquely relative to each other and to a longitudinal axis, in a three-dimensional oblique view, FIG. 47 a side view of the connecting coupling from FIG. 46, FIG. 48 a sectional view through the connecting coupling from FIG. 46 along the section line in FIG. 47, FIG. 49 a further connecting coupling according to the invention with ribs which each form eyes, in an oblique bottom view, FIG. 50 the connecting coupling from FIG. 49 in an oblique top view, and FIG. 51 the connecting coupling from FIG. 49 in a side view.

DETAILED DESCRIPTION

Figure 5:
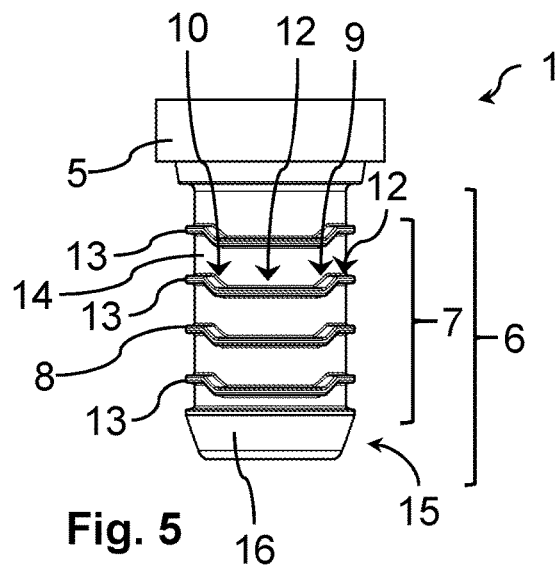

FIG. 1 shows a connecting coupling according to the invention, designated as a whole with 1, on which a hose end 2 of a hose 3 is applied. The hose end 2 is crimped with a crimp sleeve 4 in the known fashion.

The connecting coupling 1 furthermore has a connecting piece 5 with which the hose 3 may be connected to a fitting, a further hose or another connection point.

FIG. 2 shows the connecting coupling 1 in an illustration cut open along an axial plane. It is evident that the connecting coupling 1 has a hose nipple 6 which is pushed into the hose end 2 for use. A rib structure 7 (see FIG. 3) is formed on an outside of the hose nipple 6. The rib structure 7 serves for tension relief and comprises at least one rib 8.

FIGS. 3 and 4 show the connecting coupling 1 from two side views, rotated relative to each other. When FIGS. 3 and 4 are viewed together, it is evident that the rib 8 is formed as a closed loop and has at least one direction change in its course which leads out from a circumferential direction.

The rib 8 has a first rib portion 9 and a second rib portion 10. The rib portions 9 and 10 are each oriented obliquely to a longitudinal axis 11 of the hose nipple 6 and obliquely to a radial plane which stands perpendicularly on the longitudinal axis 11, i.e. also obliquely to a circumferential direction lying in the radial plane. The terms circumference, tangent and radius in this description may relate to the longitudinal axis 11.

Here, the rib portions 9 and 10 each follow a course direction 17, 18 which is defined by a tangent along the course. The course direction 17 of the first rib portion 9 is here not oriented parallel to the course direction 18 of the second rib portion 10. Rather, in the exemplary embodiment, it is provided that the course directions intersect at a point. In further exemplary embodiments, it is provided that the course directions do not intersect but are arranged skewed relative to each other. Because of the change in course direction 17, 18, a direction change of the rib 8 is achieved which occurs between the first rib portion 9 and the second rib portion 10.

Because of the arrangement of the rib portions 9 and 10, it is ensured that an applied hose end 2 cannot slip in the circumferential direction along the rib 8, so security against twisting is achieved.

Holding portions 12 are formed between the first rib portion 9 and the second rib portion 10. In the exemplary embodiment, the holding portions 12 run approximately along a radial plane, i.e. in the circumferential direction. The holding portions 12 each ensure tension relief. A rib portion 9, 10 is arranged at both ends of each of the holding portions 12 and delimits the holding portion 12. It may also be said that each holding portion 12 constitutes a second rib portion 10 in the sense of this description, since the course direction 17 of the first rib portion 9 runs at an angle to the circumferential direction. The rib 8 undergoes a respective direction change between the first rib portion 9 and the holding portion 12, and between the holding portion 12 and the second rib portion 10.

In addition to the rib 8, the rib structure has further ribs 13. The further ribs 13—in the exemplary embodiment there are four further ribs 13—are in principle formed similarly to the rib 8.

The exemplary embodiment shows that the further ribs 13 each run at a constant distance from the rib 8.

In the exemplary embodiment, the connecting coupling 1 is made of plastic in the injection molding process. The depiction in FIG. 4 is selected such that a tool separating line lies in the drawing plane and runs around the entire contour of the connecting coupling 1.

The rib 8 and the further ribs 13 are configured such that the two-part injection molding tool can be separated for removal from the mold, in a direction standing perpendicularly to the drawing plane in FIG. 4, without colliding with the rib structure. This achieves that at every point of their course, the rib 8 and the further ribs 13 are each oriented with a tangential direction at their side face tangentially to the mold removal direction, or at least such that no undercuts occur which could hinder mold removal.

It is clear from FIG. 3 that the rib 8 in rib portion 9 and rib portion 10 does not protrude in the radial direction from the preferably cylindrical base body 14 of the hose nipple 6, but slopes relative to the radial direction so as to give the described removability from the mold.

A connecting aid 16 is formed on the free end 15 of the hose nipple 6. The connecting aid 16 is formed tapering towards one end, preferably conically.

In order to push the hose end 2 over the rib structure 7, the outer diameter of the connecting aid 16 at its thickest point, i.e. the maximum outer diameter of the connecting aid 16, is at least equal to or even larger than the maximum outer diameter of the rib structure 7.

FIGS. 5 to 21 show further exemplary embodiments of the invention. Functional and design details and components which are similar or identical to the details and components of the preceding exemplary embodiment carry the same reference signs and are not described separately again. The statements relating to FIGS. 1 to 4 therefore apply accordingly to FIGS. 5 to 21.

The exemplary embodiment in FIG. 5 differs from the exemplary embodiment in FIGS. 1 to 4 in that only three further ribs 13 are provided.

Figure 6:
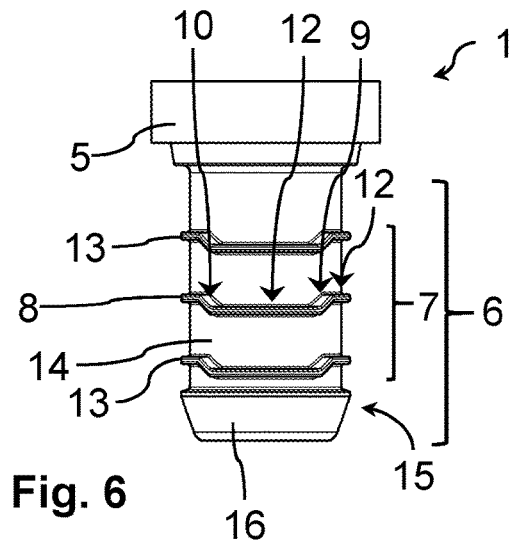

In the exemplary embodiment according to FIG. 6 however, only two further ribs 13 formed.

In further exemplary embodiments, different numbers of further ribs 13 are formed, for example more than four or less than two.

Figure 7:
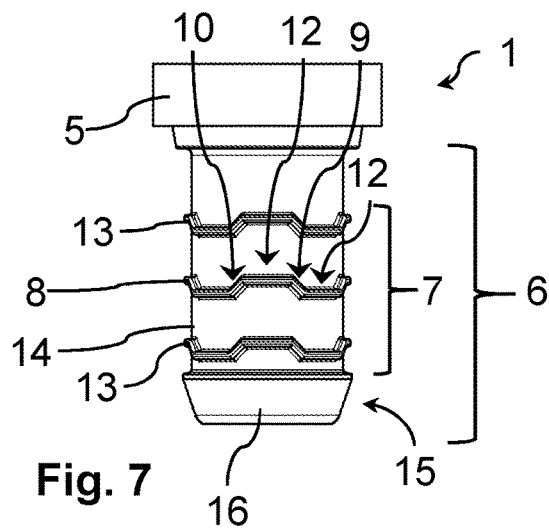

The exemplary embodiment in FIG. 7 differs from the preceding exemplary embodiments in that the holding portions 12 are each formed shorter. Thus, the rib 8 has a whole has eight holding portions 12 with rib portions 9, 10 in between.

Figure 8:
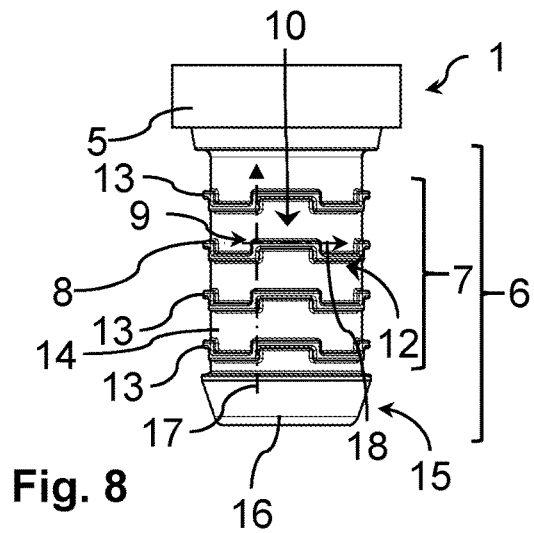

The exemplary embodiment in FIG. 8 differs from the preceding exemplary embodiments in that the first rib portion 9 is set more steeply and runs parallel to the longitudinal axis 11, while the second rib portion 10 is oriented in the circumferential direction and runs in a radial plane. This achieves that the second rib portion 10 also acts as a holding portion. The angle between the course direction 17 of the first rib portion 9 and the course direction 18 of the second rib portion 10 in the example is 90°.

Figure 9:
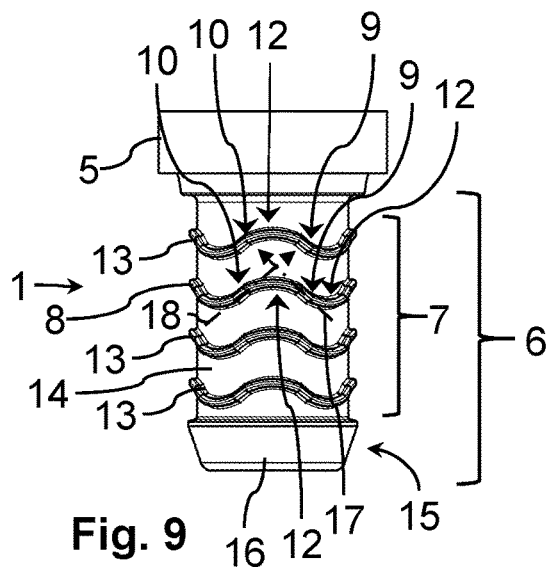
Figure 10:
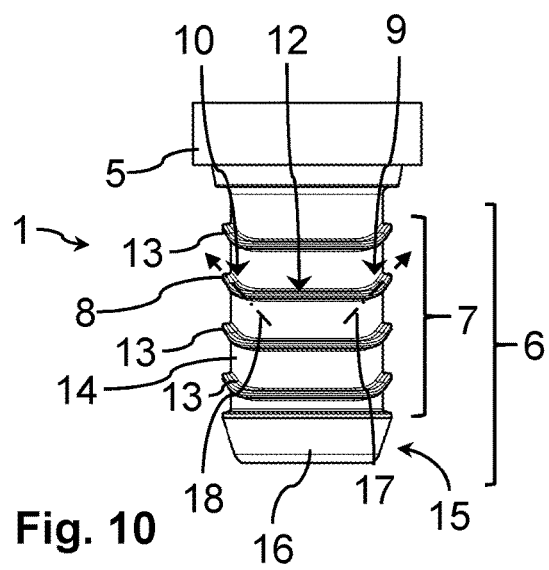

The exemplary embodiments in FIGS. 9 and 10 differ from the preceding exemplary embodiments in that the rib portions 9, 10 are not rectilinear but curved.

If we consider a tangent at any point in each of the rib portions 9, 10, this gives a course direction 17, 18 of the rib 8 at this point which runs at an angle to a corresponding course direction 17, 18 in the respective other rib portion 9, 10.

Figure 22:
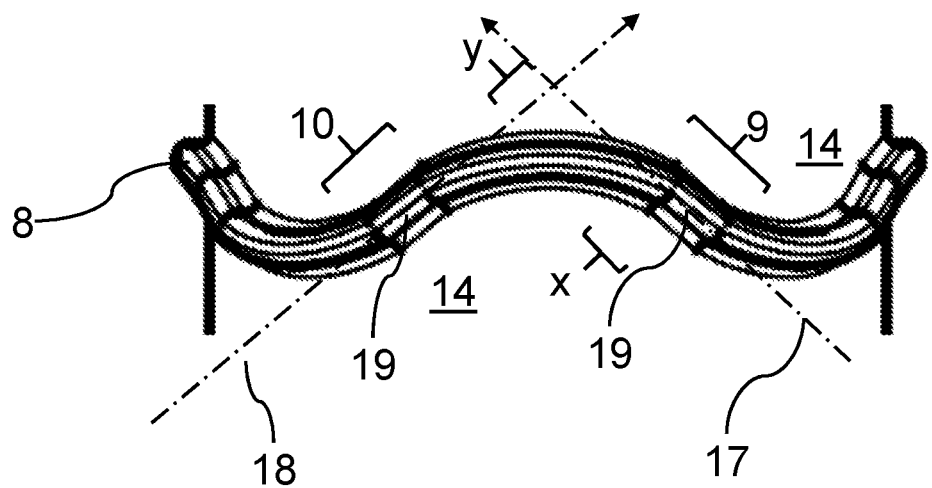
Figure 23:
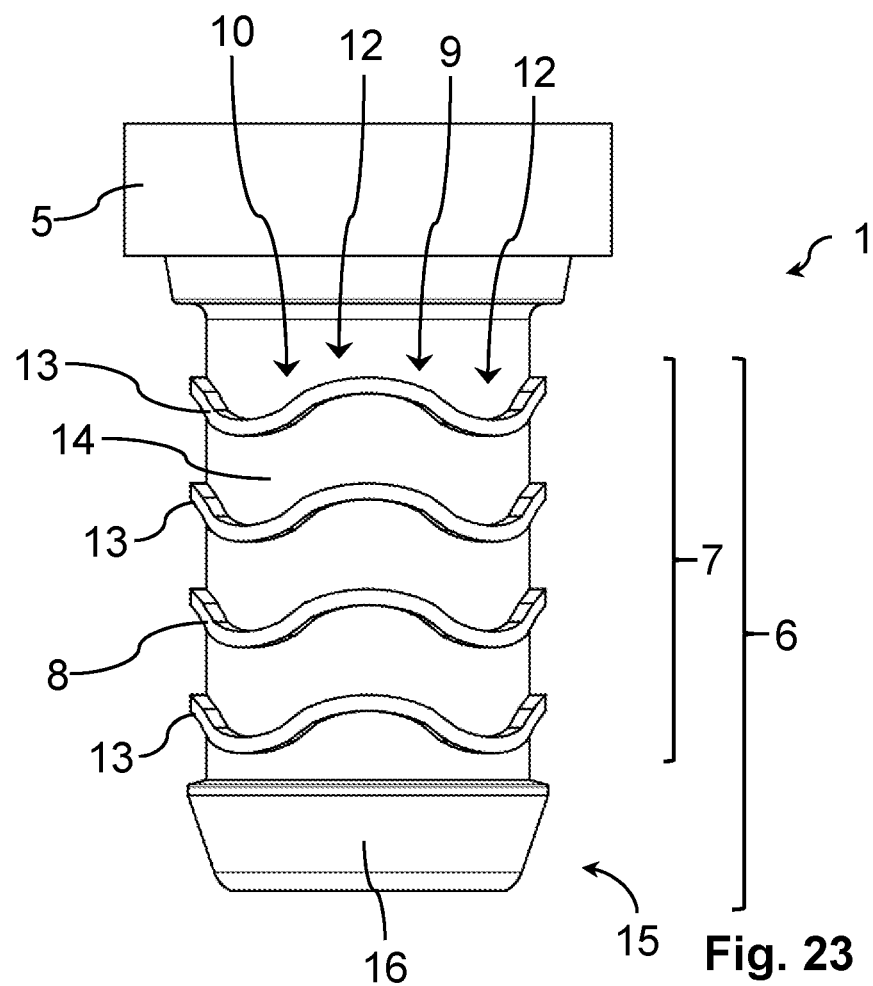
Figure 24:
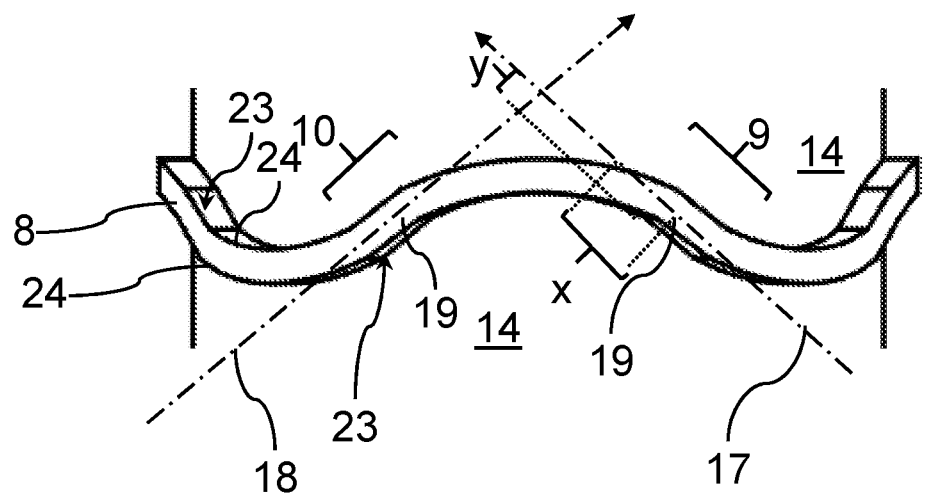

The infinitesimal following of the course direction 17, 18 by the rib 8 in the respective rib portion 9, 10 is shown in FIG. 22 in an enlargement of FIG. 9. It is evident that the rib 8 follows the course directions 17, 18 only as a tangent. Beyond the foot point 19 of this tangent, i.e. beyond the point at which the course directions 17, 18 each intersect the rib 8, the deviation y rises more than linearly with the distance x from the foot point. The region at which it could still be said, in the sense of this invention, that the rib 8 follows the respective course directions 17, 18, is indicated in FIG. 22 with reference signs 9 and 10.

In the exemplary embodiment in FIG. 9, in addition each holding portion 12 is curved. On average, the holding portion 12 is still oriented approximately along a radial plane or in the circumferential direction.

In the exemplary embodiment of FIG. 10, the holding portions 12 are however formed substantially straight.

Figure 11:
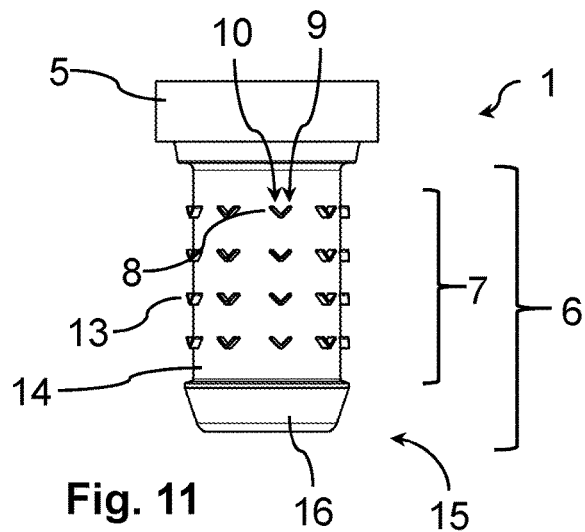

In the exemplary embodiment according to FIG. 11, the rib structure 7 does not have continuous ribs, but the ribs 8 and the further ribs 13 each extend only over a portion of the circumference. The ribs 8 (and the further ribs 13) are here each composed of two rib portions 9 and 10, without a holding portion 12 being formed in between. Each rib 8 is here limited to a narrow portion of the circumference.

Figure 12:
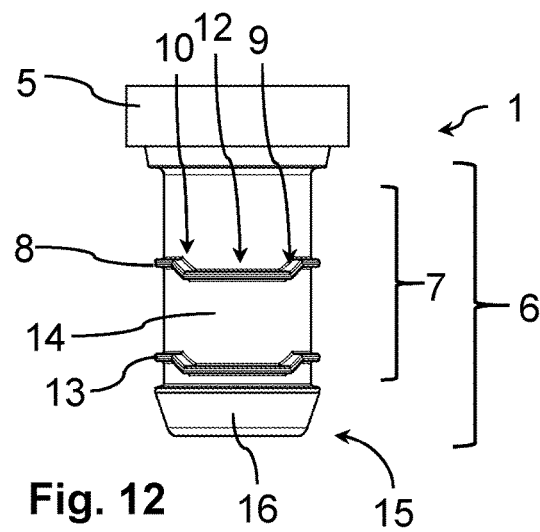

In the exemplary embodiment in FIG. 12, only one further rib 13 is formed in addition to the rib 8.

Figure 13:
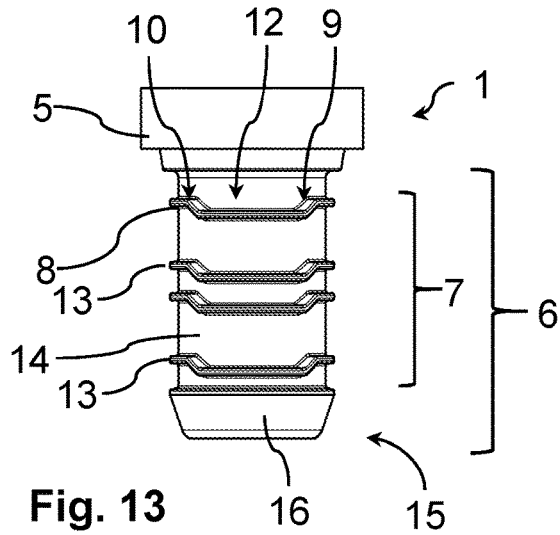

In the exemplary embodiment according to FIG. 13, the further ribs 13 are not spaced evenly from each other and from the rib 8.

In further exemplary embodiments, the further ribs 13 are not guided at a constant distance from the rib 8, but some or all of the further ribs 13 are however formed geometrically identically but oriented offset by a rotation about the longitudinal axis 11 relative to the rib 8. In this way for example, it can easily be ensured that the rib portions 9, 10 are not aligned along the longitudinal axis 11.

Figure 14:
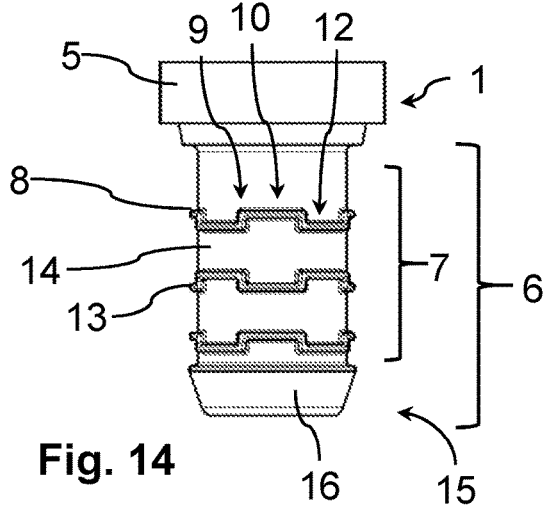
Figure 15:
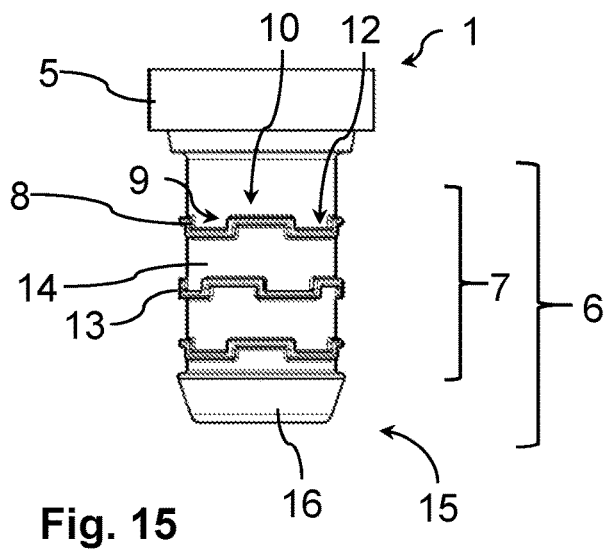
Figure 16:
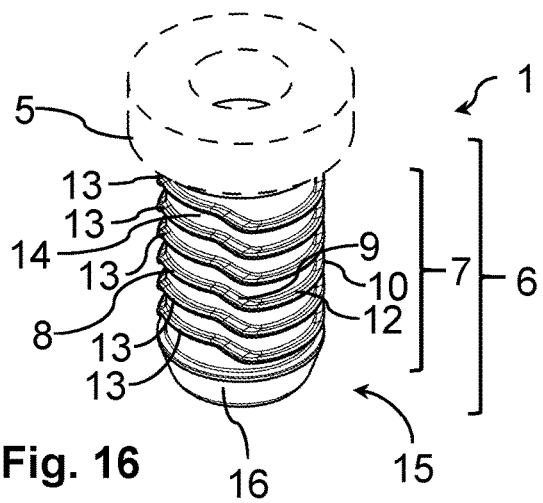
Figure 17:
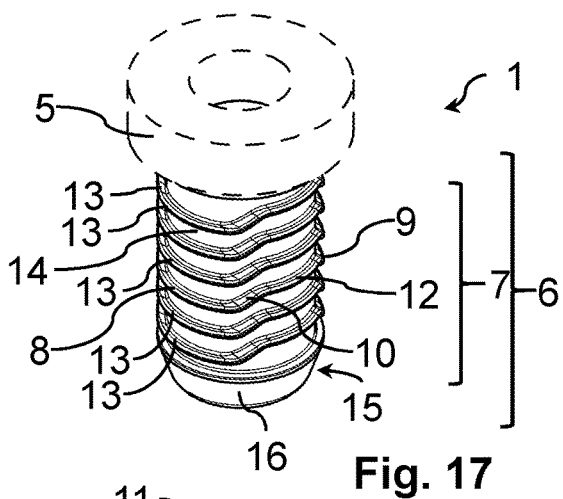
Figure 18:
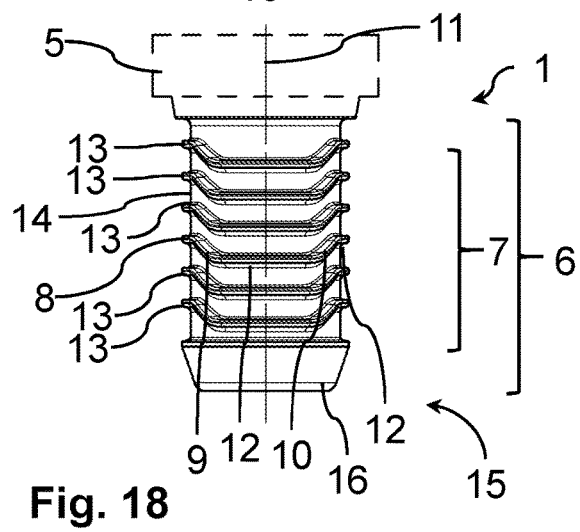

FIGS. 14 and 15 show arrangements in which the further ribs 13 are each arranged offset by an angular amount relative to the rib 8. This angular amount may for example be 90°, 45° or 22.5°, or another amount.

In further exemplary embodiments, other numbers of ribs 8, 13 and other distances between the individual ribs 8, 13 of the rib structure 7 are implemented. In further exemplary embodiments, mixed forms are implemented in which individual ribs or rib forms of the exemplary embodiments described above are combined with each other.

In the exemplary embodiment in FIGS. 16 to 21, the connecting piece 5 is indicated by dotted lines. The connecting piece 5 may have any arbitrary form depending on the needs of the connecting point. This also applies to the other exemplary embodiments.

Figure 19:
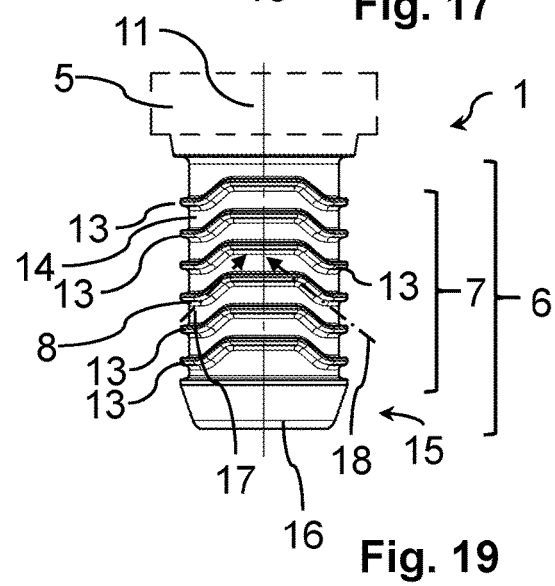
Figure 20:
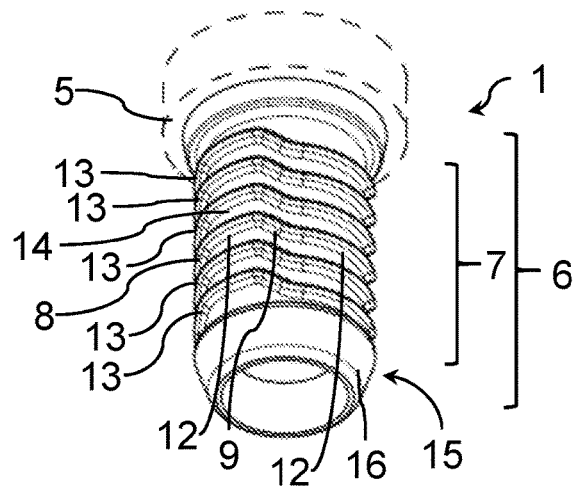
Figure 21:
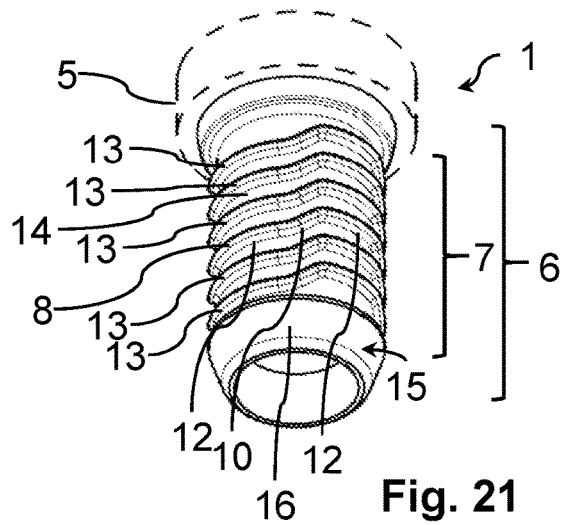

It is evident from FIGS. 16 to 21 that the rib portions 9, 10 are not oriented radially with their side faces 23, in order to guarantee the described removability from the mold. For this, the ribs 8, 10 slope at every point of their course relative to the base body 14 such that they align with the viewing direction in the illustration in FIG. 20. FIG. 19 however shows side faces 23 of the rib portions 9, 10 which become visible because of this orientation.

In general, it may be said that the orientation of the viewing direction in FIGS. 3, 5, 6, 10, 12, 13 and 18 is selected similar to that in FIG. 3, i.e. the viewing direction is oriented transversely to the mold removal direction. In FIGS. 4 and 19 however, the mold removal direction corresponds to the viewing direction.

In the exemplary embodiment in FIG. 11, it is clear that the described removability from the mold is not guaranteed. From the other exemplary embodiments however, it is clear how the V-shaped ribs 8, 13 must be changed in order to achieve a removability from the mold.

Figure 25:
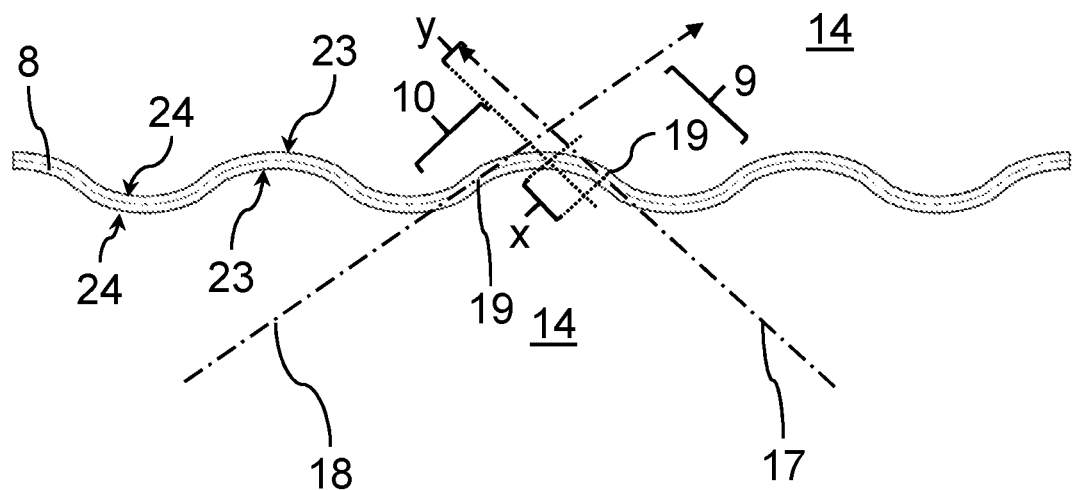
Figure 26:
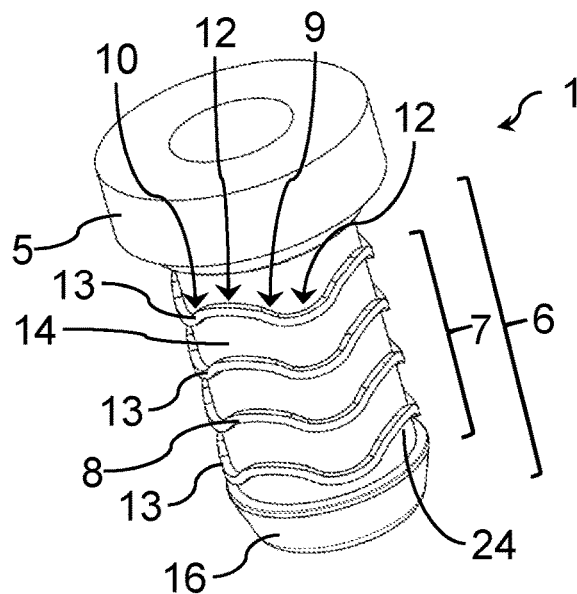

FIGS. 23 to 26 show a further exemplary embodiment according to the invention. Functional and design details and components which are similar or identical to details and components of the preceding exemplary embodiment carry the same reference signs and are not described again separately. The statements relating to FIGS. 1 to 22 therefore apply accordingly to FIGS. 23 to 26. Here, FIG. 25 shows the rib 8 from FIG. 24 extending from the cylindrical base body 14 and lying in a plane.

The exemplary embodiment in FIGS. 23 to 26 differs from the preceding exemplary embodiments in that the rib profile 20 is not rounded but rectangular.

It is evident that the ribs 8, 13 in rib portions 9, 10 follow a respective course direction 17, 18, as described in detail with reference to FIG. 22.

Figure 27:
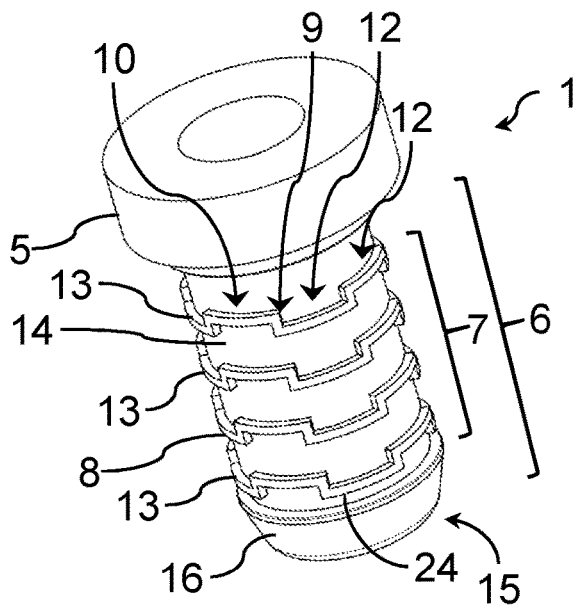

FIG. 27 shows a further exemplary embodiment according to the invention. Functional and design details and components which are similar or identical to details and components of the preceding exemplary embodiment carry the same reference signs and are not described again separately. The statements relating to FIGS. 1 to 26 therefore apply accordingly to FIG. 27.

It is evident that the course of the ribs 8, 13 resembles that in FIG. 8. However, the rib profile 20 here is again rectangular and not rounded.

Figure 28:
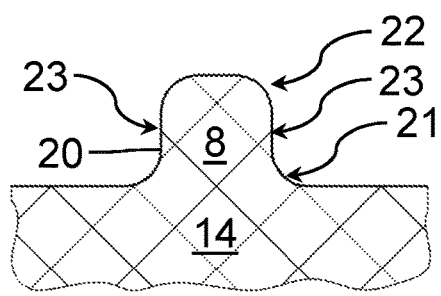

FIG. 28 shows a rib profile 20, i.e. a cross-section through the rib 8, 13 transversely to the course direction 17, 18, as present for example in FIGS. 1 to 22. The rib profile 20 has a foot region 21 and a head region 22, between which the side faces 23 of the rib profile 20 are formed.

It is evident that the rib profile 20 is formed rounded with transitions in the head region 22 and in the foot region 21.

Figure 29:
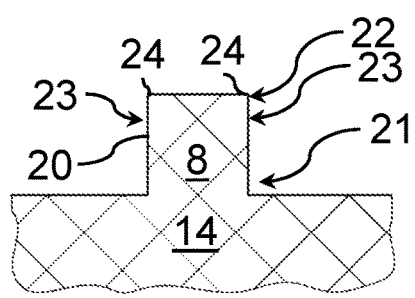

In contrast, the rib profile 20 in FIG. 29 is formed angular in the head region 22 and in the foot region 21. The ribs 8, 13, for example the ribs 8, 13 in FIGS. 23 to 26, therefore have longitudinal edges 24.

Figure 30:
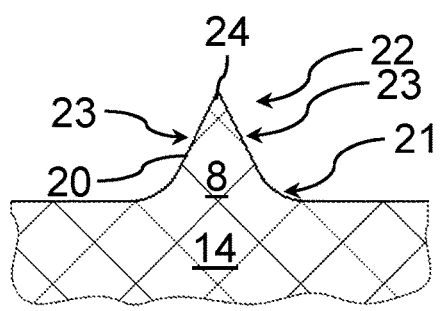

FIG. 30 shows a substantially triangular rib profile 20. This is rounded in the foot region 21 and angular in the head region 22. There is thus a single longitudinal edge 24.

In further exemplary embodiments, the rib profile is rounded in the head region and angular in the foot region, while in other exemplary embodiments the rib profile is rounded in the foot region and angular in the head region.

In further exemplary embodiments, a relief groove is formed in the foot region 21 of the ribs 8, 13, 26. Thus notch stresses can be reduced.

In the exemplary embodiments shown, all ribs 8 and further ribs 13 of a connecting coupling 1 have mutually corresponding rib profiles 20.

In further exemplary embodiments, the rib and at least one of the further ribs have mutually differing rib profiles. This may be accompanied for example by an angular or rounded design of the rib profile in the foot region and/or in the head region.

Figure 31:
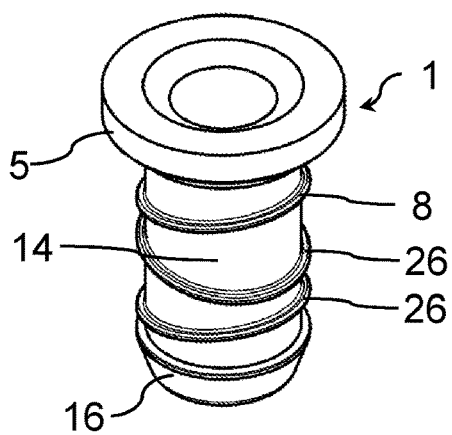
Figure 32:
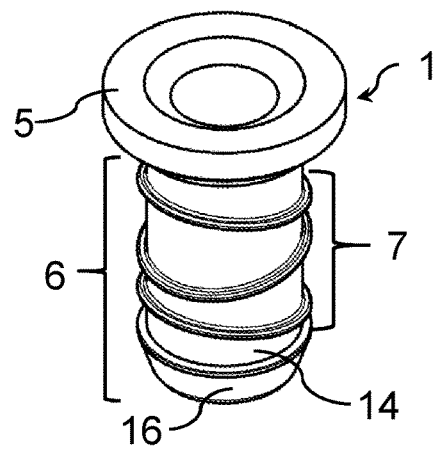
Figure 33:
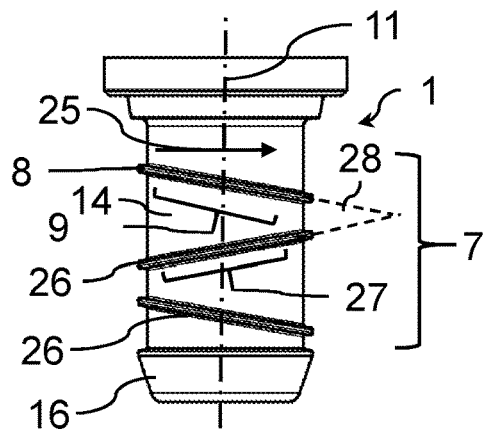

FIGS. 31 to 40 show various views of a further connecting coupling 1 according to the invention. Here, several ribs are formed, which are each configured as ellipses running around the base body 14. Each of the three ribs 8, 26 shown in FIG. 31 or FIG. 33 is positioned skewed relative to a circumferential direction 25 of the hose nipple 6, which is illustrated in FIG. 33 by means of an arrow. Each of the ribs 8, 26 runs in a closed loop around the base body 14. The ribs 8, 26 are spaced apart from each other and do not cross.

The ellipse form here results from the fact that the base body 14 has a cylindrical outer contour, and the ribs 8, 26 each run in a plane and obliquely relative to said circumferential direction 25 which—as shown in FIG. 33—runs perpendicular to the longitudinal axis 11 of the connecting coupling 1.

Figure 34:
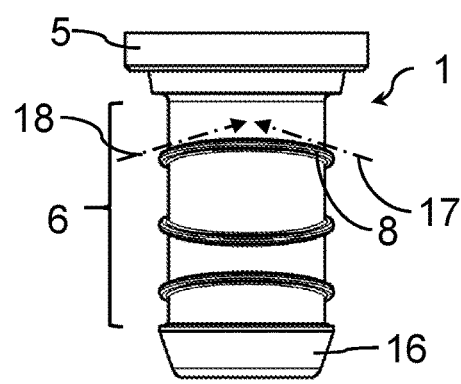

FIG. 34 furthermore illustrates that in this embodiment too, individual ribs 8, 26 undergo a direction change along their respective course. As the dotted arrows show, individual ribs 8, 26 have portions which follow different course directions 17, 18. In FIG. 34, these directions 17, 18 meet at a point below which the topmost of the three ribs shown undergoes a direction change: to the left of the point of direction change, the rib 8 rises from left to right, while it thereafter falls again i.e. moves in the direction of the connecting aid 16.

Figure 35:
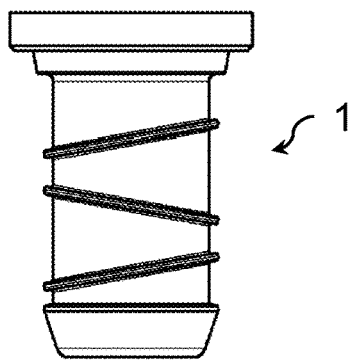
Figure 36:
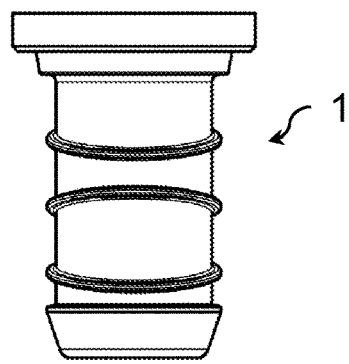

Finally, FIGS. 33 and 35 clearly show that the two lower ribs 26 are tilted relative to each other and are not parallel. Alternatively, it could be said that the ribs 8, 26 are indeed formed similarly but are arranged twisted about a longitudinal axis 11 relative to each other.

FIGS. 41 to 43 show a further exemplary embodiment according to the invention. Functional and design details and components which are similar or identical to details and components of the preceding exemplary embodiment carry the same reference signs and are not described again separately. The statements relating to FIGS. 1 to 40 therefore apply accordingly to FIGS. 41 to 43.

The exemplary embodiment in FIGS. 41 to 43 differs from the exemplary embodiment in FIGS. 31 to 40 at least in that the further ribs 13 are oriented not obliquely or at an angle 28 to the respective adjacent ribs 8, 13, but parallel to the rib 8. Each rib 8, 13 accordingly describes a plane in which the rib 8, 13 lies, and these planes lie parallel to each other.

FIGS. 44 and 45 show a further exemplary embodiment according to the invention. Functional and design details and components which are similar or identical to details and components of the preceding exemplary embodiment carry the same reference signs and are not described again separately. The statements relating to FIGS. 1 to 43 therefore apply accordingly to FIGS. 44 and 45.

This exemplary embodiment differs from the preceding exemplary embodiments at least in that the base body 14 is not cylindrical but conical.

In further exemplary embodiments, other tapering profiles may be formed, for example a trumpet-like base body.

These base bodies may also be formed in the preceding and/or the following exemplary embodiments.

The exemplary embodiment in FIGS. 44 and 45 also differs from the other exemplary embodiments in that the direction change in the ribs 8, 13 is in each case significantly more than 90°, for example lies between 130° and 140°.

FIGS. 46 to 48 show a further exemplary embodiment according to the invention. Functional and design details and components which are similar or identical to details and components of the preceding exemplary embodiment carry the same reference signs and are not described again separately. The statements relating to FIGS. 1 to 45 therefore apply accordingly to FIGS. 46 to 48.

This exemplary embodiment differs from the preceding exemplary embodiments at least in that a height h1, h2 (see FIG. 48) of the ribs 8, 13 varies along the course of these ribs 8, 13. Thus rib portions are formed with a smaller height h1 and ones with a larger height h2. In this way, tongue-like moldings 29 are formed. This in itself achieves security against twisting and reinforces an axial holding force.

Figure 49:
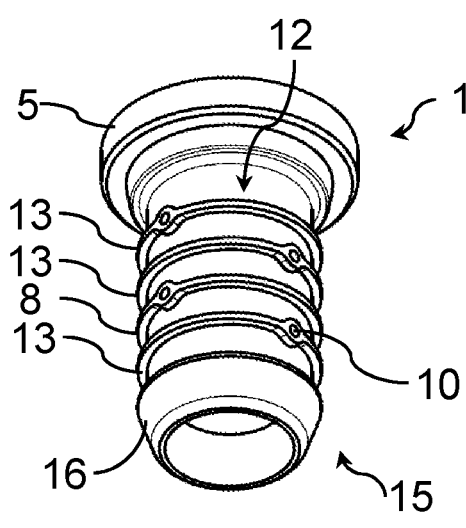
Figure 50:
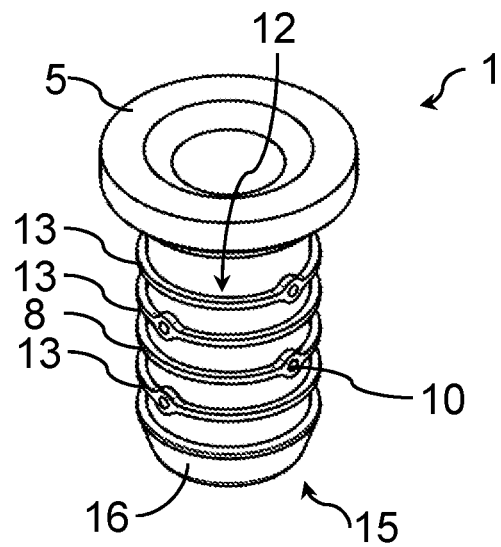
Figure 51:
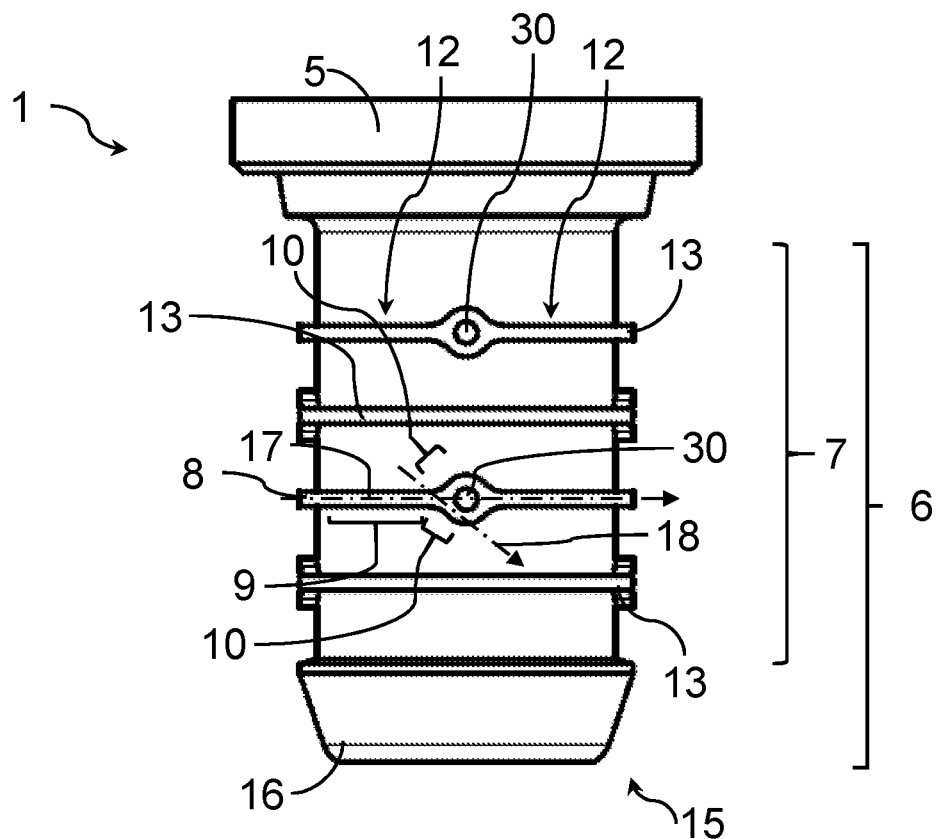

FIGS. 49 to 51 show a further exemplary embodiment of the invention. Functional and design details and components which are similar or identical to details and components of the preceding exemplary embodiment carry the same reference signs and are not described again separately. The statements relating to FIGS. 1 to 48 therefore apply accordingly to FIGS. 49 to 51.

The exemplary embodiment in FIGS. 49 to 51 differs from the preceding exemplary embodiments in that each rib 8, 13 divides and recombines again at several points in order to form an eye 30. This division in each case forms two second rib portions 10, the course directions 18 of which (only shown for one rib portion 10 in FIG. 51) enclose an angle with the course direction 17 of the adjacent first rib portion 9.

To summarize, in a connecting coupling 1, it is proposed to orient at least two rib portions 9, 10 at an angle to each other in at least one rib 8 of a rib structure 7 of at least one hose nipple 6, such that the course directions 17, 18 in the rib portions 9, 10 are oriented at an angle relative to each other, and/or to configure the at least one rib 8 so as to be cross-free and continuous and to orient this axially obliquely in at least one rib portion 9, 10.

LIST OF REFERENCE SIGNS

1 Connecting coupling
2 Hose end
3 Hose
4 Crimp sleeve
5 Connecting piece
6 Hose nipple
7 Rib structure
8 Rib
9 (First) rib portion
10 (Second) rib portion
11 Longitudinal axis
12 Holding portions
13 Further rib
14 Base body
15 Free end
16 Connecting aid
17 (First) course direction
18 (Second) course direction
19 Foot point
20 Rib profile
21 Foot region
22 Head region
23 Side face
24 Longitudinal edge
25 Circumferential direction
26 Further rib
27 Further rib portion
28 Angle
29 Molding
30 Eye
h1 (Lesser) height
h2 (Greater) height

The invention claimed is:

1. A connecting coupling (1) for a hose (3), the connection coupling comprising a hose nipple (6) on which a rib structure (7) with at least one rib (8) is formed with a closed loop, continuous, and non-crossing profile, and the rib (8) defines a course that has at least one direction change, and further comprising a further rib (13) defining a course that has at least one direction change, wherein the rib (8) and the further rib (13) do not overlap with each other in a radial plane.

2. The connecting coupling (1) as claimed in claim 1, wherein the at least one rib (8) is formed as an ellipse lying obliquely relative to a circumferential direction of the hose nipple (6), and the at least one ellipse runs around a cylindrical or conical base body (14) of the hose nipple (6).

3. The connecting coupling (1) as claimed in claim 1, wherein the hose nipple includes a base body (14), the at least one rib (8) is formed on the base body (14), and the base body (14) has a non-cylindrical form.

4. The connecting coupling (1) as claimed in claim 1, wherein the rib (8) is formed running around the hose nipple (6) in at least one of a closed or non-crossing loop, or the rib (8) is limited to one circumferential portion.

5. The connecting coupling (1) as claimed in claim 1, wherein the hose nipple (6) has a connecting aid (16), and a maximum outer diameter of the connecting aid is at least equal to a maximum outer diameter of the rib structure (7).

6. The connecting coupling (1) as claimed in claim 1, wherein the hose nipple (6) has a tool separating line which defines a mold removal direction, and at every point along the course, the rib (8) is oriented relative to the mold removal direction such that no undercuts occur by orienting side faces of the rib (8) tangentially to said mold removal direction.

7. The connecting coupling (1) as claimed in claim 1, wherein the at least one rib (8) has a rib profile (20) which is rounded or angular in at least one of a foot region (21) or a head region (22) thereof.

8. The connecting coupling (1) as claimed in claim 1, wherein the hose nipple includes a base body (14), the at least one rib (8) is formed on the base body (14), and the base body (14) has a cylindrical form.

9. A connecting coupling (1) for a hose (3), the connection coupling comprising a hose nipple (6) on which a rib structure (7) with at least one rib (8) and at least one further rib (13) are formed, the rib (8) includes a first rib portion (9) and a second rib portion (10) with a holding portion (12) therebetween that extends in a radial plane with respect to a longitudinal axis (11) of the hose nipple (6), the first rib portion (9) follows a first course direction (17) oblique to the holding portion (12) and the second rib portion (10) follows a second course direction (18) oblique to the holding portion (12), and the first course direction (17) is oriented at an angle to the second course direction (18), wherein the further rib (13) defines a course that has at least one direction change, wherein the rib (8) and the further rib (13) do not overlap with each other in a radial direction.

10. The connecting coupling (1) as claimed in claim 9, wherein the first rib portion (9) adjoins the second rib portion (10).

11. The connecting coupling (1) as claimed in claim 9, wherein the at least one holding portion (12) is at least one of delimited at a first end by the first rib portion (9) or delimited at a second end by the second rib portion (10).

12. The connecting coupling (1) as claimed in claim 9, wherein the further rib (13) runs around the hose nipple (6) and is at least one of at a constant distance from the rib (8) or offset by a rotational angle relative to the rib (8), and the further rib (13) has a first rib portion (9) and a second rib portion (10), the first rib portion (9) of the further rib follows a first course direction (17) and the second rib portion (10) of the further rib follows a second course direction (18), and the first course direction (17) is oriented at an angle to the second course direction (18).

13. The connecting coupling (1) as claimed in claim 9, wherein at least one of the first rib portion (9) or the second rib portion (10) is oriented at an angle to at least one of a longitudinal axis (11) of the hose nipple (6) or a or circumferential direction of the hose nipple (6).

14. The connecting coupling (1) as claimed in claim 9, wherein the at least one rib (8) has at least one of a varying thickness or a varying height (h1, h2).

15. A connecting coupling (1) for a hose (3), the connection coupling comprising a hose nipple (6) on which a rib structure (7) with at least one rib (8) and at least one further rib (13) are formed, the at least one rib (8) is formed as a non-crossing circumferential rib (8), and includes at least one rib portion (9, 10) that runs obliquely relative to a circumferential direction of the hose nipple (6), wherein the at least one further rib (13) defines a course that has at least one direction change, wherein the rib (8) and the further rib (13) do not overlap with each other in a radial direction.

16. A connecting coupling (1) for a hose (3), the connection coupling comprising a hose nipple (6) on which a rib structure (7) with at least one rib (8) and at least one further rib (13) is formed,

- the at least one rib (8) has at least one holding portion (12) running in a radial plane that is perpendicular to a longitudinal axis (11) of the hose nipple (6),
- the rib (8) is formed as a circumferential rib running around the hose nipple (6),
- wherein the at least one rib (8) defines a course that has at least one directional change,
- wherein the at least one further rib (13) defines a course that has at least one direction change, wherein the at least one rib (8) and the at least one further rib (13) do not overlap with each other in a radial direction.

17. A connecting coupling (1) for a hose (3), the connection coupling comprising a hose nipple (6) on which a rib structure (7) with at least one rib (8) is formed,

- the rib (8) defines a course that has at least one direction change,
- the rib (8) is formed as a circumferential rib running around the hose nipple (6),
- the rib structure (7) includes a further rib (13) running around the hose nipple (6) and defining a course that has at least one direction change,
- wherein the rib (8) and further rib (13) run at a distance from each other such that a circumferential area between the rib (8) and the further rib (13) is free of any rib, and the rib (8) and the further rib (13) do not overlap with each other in a radial direction.

\* \* \* \* \*